(12) United States Patent
Wong (10) Patent No.: US 9,640,288 B1
(45) Date of Patent: May 2, 2017

(54) FLEXIBLE RADIATION SHIELD

(71) Applicant: Space Systems/Loral, LLC, Palo Alto, CA (US)

(72) Inventor: Kit Pui Frankie Wong, Redwood City, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 0 days.

(21) Appl. No.: 14/954,583

(22) Filed: Nov. 30, 2015

(51) Int. Cl.
*G21F 1/12* (2006.01)
*G21F 3/00* (2006.01)

(52) U.S. Cl.
CPC .............. *G21F 1/125* (2013.01); *G21F 3/00* (2013.01)

(58) Field of Classification Search
CPC ... G21F 3/00; G21F 3/02; G21F 3/025; G21F 3/03; G21F 3/035
See application file for complete search history.

(56) References Cited

U.S. PATENT DOCUMENTS

| | | | |
|---|---|---|---|
| 4,923,741 A | 5/1990 | Kosmo et al. | |
| 5,324,952 A | 6/1994 | Cummings | |
| 6,048,805 A | 4/2000 | Gottfried | |
| 6,455,864 B1 | 9/2002 | Featherby et al. | |
| 6,476,317 B1* | 11/2002 | Frederickson | G21F 1/10 174/350 |
| 6,841,791 B2 | 1/2005 | DeMeo et al. | |
| 7,518,137 B2* | 4/2009 | Okamura | B32B 15/04 250/505.1 |
| 8,354,658 B1* | 1/2013 | Smith | G21F 1/125 250/515.1 |
| 2011/0165373 A1* | 7/2011 | Khandkar | B32B 33/00 428/137 |
| 2013/0047521 A1* | 2/2013 | Yoder | G21F 1/125 52/79.7 |
| 2013/0048887 A1* | 2/2013 | Yoder | G21F 3/00 250/515.1 |
| 2014/0246609 A1 | 9/2014 | DeBaun | |

FOREIGN PATENT DOCUMENTS

EP     1 120 795 A1     8/2001

OTHER PUBLICATIONS

Tracino et al., "Space Radiation Shielding for Human Mission: Materials and Concepts," ThalesAlenia Space, 2010, 30 pages.

\* cited by examiner

*Primary Examiner* — Nicole Ippolito
*Assistant Examiner* — Sean Luck
(74) *Attorney, Agent, or Firm* — Weaver Austin Villeneuve & Sampson LLP (57) ABSTRACT

A pliable multilayer blanket configured as a particle radiation shield, the blanket including multiple layers. A first layer of the multiple layers is composed of a first material and a second layer of the multiple layers is composed of a second material, different from the first material, each layer being less than 20 mils thick. At least one of the first material and the second material is a metal or metal alloy having an atomic number (Z) of at least 29.

18 Claims, 5 Drawing Sheets

View B-B

Figure 1

View B-B

Figure 2

View C-C

FLEXIBLE RADIATION SHIELD

TECHNICAL FIELD

This invention relates generally to particle radiation shields for space applications, and, more particularly, to a pliable multilayer blanket configured as a particle radiation shield.

BACKGROUND OF THE INVENTION

The assignee of the present invention manufactures and deploys spacecraft for, inter alia, communications and broadcast services. Such spacecraft may be required to survive an extended life (10 years or more) in a space environment that includes significant exposure to potentially damaging radiation to material and electronics, and charging in space that can lead to discharge.

Because such spacecraft include electronic components that are susceptible to radiation damage, various radiation shielding schemes such as, for example, described in EP1120795, owned by the assignee of the present invention, and incorporated into the present application in its entirety, have been developed.

Shielding techniques affording lower mass and reduced cost are desirable.

SUMMARY

The present inventors have appreciated that a particle radiation shield may be formed from a pliable multilayer blanket including at least one layer composed of a metal or metal alloy having an atomic number (Z) of at least 29.

According to some implementations, an apparatus includes a pliable multilayer blanket configured as a particle radiation shield, the blanket including multiple layers. A first layer of the multiple layers is composed of a first material and a second layer of the multiple layers is composed of a second material, different from the first material, each layer being less than 20 mils thick. At least one of the first material and the second material is a metal or metal alloy having atomic number (Z) of at least 29.

In some examples, the pliable multilayer blanket may provide a particle radiation shielding equivalent to an aluminum panel having a thickness of 15 mils. In some examples, the pliable multilayer blanket may have a weight per unit area at least 10% less than the aluminum panel.

In some examples, at least one layer may be attached, non-rigidly, to an adjacent layer.

In some examples, a flexible adhesive may be disposed between the first layer and the second layer.

In some examples, the first material may have a substantially different Z value than the second material. In some examples, the first material may have a first Z value and the second material has a second Z value, the first Z value being less than or equal to 75% of the second Z value. In some examples, the first material may be a non-metal and the second material is a nonmagnetic metal or nonmagnetic metal alloy. In some examples, the first material may be aluminum or a polyamide composite and the second material is copper, molybdenum, tin or tantalum.

In some examples, a total thickness of the pliable multilayer blanket may be less than 30 mils.

In some examples, the pliable multilayer blanket may include an insert configured to provide an electrically conductive coupling between two or more layers of the pliable multilayer blanket.

In some examples, the pliable multilayer blanket may include a third layer. In some examples, the third layer may be composed of one of the first material and the second material. In some examples, the third layer may be composed of a third material that is different from both the first material and the second material. In some examples, the pliable multilayer blanket may provide a radiation shielding equivalent to or better than an aluminum panel having a thickness of 28.5 mils. In some examples, the pliable multilayer blanket may have a mass per unit area at least 15% less than the aluminum panel.

According to some implementations, a method includes installing a particle radiation shield onto a spacecraft, wherein the particle radiation shield is formed from a pliable multilayer blanket, the blanket including multiple layers. A first layer of the multiple layers is composed of a first material and a second layer of the multiple layers composed of a second material, different from the first material, each layer being less than 20 mils thick. At least one of the first material and the second material is a metal or metal alloy having atomic number (Z) of at least 29.

In some examples, the first material may have a first Z value and the second material may have a second Z value, the first Z value being less than or equal to 75% of the second Z value, and installing the particle radiation shield may include disposing the multilayer blanket on the spacecraft such that the first material is facing a direction from which incoming particle radiation is expected to arrive.

In some examples, the particle radiation shield may include an insert configured to provide an electrically conductive coupling between two or more layers of the particle radiation shield and installing the particle radiation shield may include providing an electrically conductive coupling between the insert and an electrical ground point of the spacecraft.

In some examples, installing the particle radiation shield may include cutting, from a bulk amount of multilayer sheet stock, a multilayer blanket having a shape defined by a planar pattern, and manually forming the multilayer blanket to fit around a spacecraft component.

BRIEF DESCRIPTION OF THE DRAWINGS

Features of the invention are more fully disclosed in the following detailed description of the preferred embodiments, reference being had to the accompanying drawings, in which.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific examples of embodiments will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or". As used herein, the term "mil" means 0.001 inches.

The presently disclosed techniques contemplate a pliable, multilayer, particle radiation shield (or "blanket") that includes two or more thin and flexible layers of shielding material. As a result of the disclosed techniques, a reduced mass particle radiation shield is provided that may be readily fabricated and installed. Because the multilayer blanket is "pliable" (by which is meant, the multilayer blanket is flexible, being easily bent, folded, or otherwise formed or shaped by manual means without being damaged), the blanket may be manually fitted into a volume within the spacecraft, or around a component of the spacecraft having a complex three dimensional shape. Moreover, a multilayer blanket may be procured economically as a bulk roll of material, from which individual shields may be formed using simple and efficient techniques and hand tools. In some implementations, one or more of the plies of material are not electrically conductive and the multilayer blanket includes provisions for electrostatic discharge (ESD) protection.

In some implementations, the multilayer blanket may include one or more sheets of material having a relatively high atomic number ("Z value" or "Z") and one or more sheets having a relatively low Z. Such implementations, which may be referred to as "graded-Z shielding", have been shown to reduce electron penetration by 60% or more compared to single material shielding. The present inventor has appreciated that graded Z shielding may be configured as a multilayer blanket. In some implementations, the multilayer blanket may be prefabricated in bulk sheet stock form, from which a large number of individual shields may be obtained. Analogous to the garment industry, portions of a roll of multilayer blanket may be cut (using shears, for example) according to a 2-D pattern of a particle radiation shield.

In some implementations, one or more of the layers may be joined together by a layer of adhesive. In some implementations, one or more of the layers are only loosely joined together by mechanical means such as rivets, staples, etc. As a result, pliability of the multilayer blanket may be increased, and operations involving application of adhesives or epoxies may be avoided, and differences, between the layers, in coefficient of thermal expansion are made largely irrelevant.

In some implementations, graded Z shielding may include alternating layers of low Z and high Z material where the high Z material has a Z number greater than or equal to 29. The low Z material may have a Z number less than or equal to 75% of the Z value of the high Z material.

Figure 1:
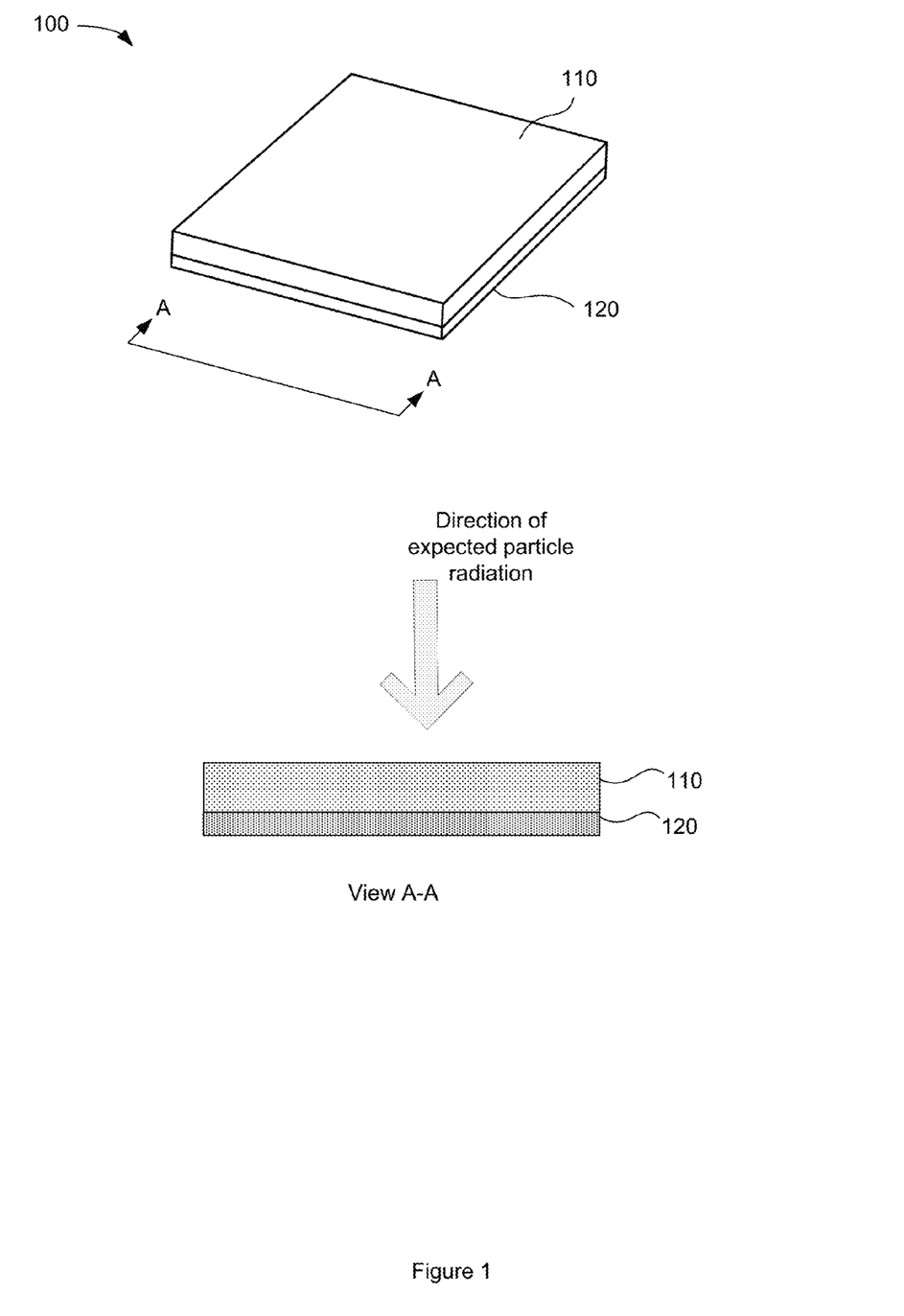
FIG. 1 illustrates an example of a pliable multilayer blanket configured as a particle radiation shield blanket having two layers, according to an implementation.

Referring to FIG. 1, an example is illustrated of a pliable multilayer blanket configured as a particle radiation shield blanket having two layers. In the illustrated implementation, a multilayer blanket 100 includes a first layer 110 formed from a material having a relatively low Z disposed adjacent to a second layer 120 formed from a material having a relatively high Z. Each of the first layer 110 and the second layer 120 may have a thickness less than approximately 20 mils. When installed on a spacecraft, the low Z layer 110 is preferably facing a direction from which incoming particle radiation is expected to arrive.

In an implementation, the first layer 110 may be formed of aluminum and the second layer 120 may be formed of tantalum. The second layer 120, being formed of tantalum, has a Z value (73) nearly six times higher than Aluminum (Z=13), and may accordingly be referred to as the high-Z layer, whereas the first layer 110 may be referred to as the low-Z layer.

In an implementation, the first layer 110 may be formed of aluminum and have a thickness of approximately 3 mils. The second layer 120 may be formed of tantalum and have a thickness of approximately 1.6 mils. The present inventor has determined that such a two ply multilayer blanket in a space radiation environment, having a thickness of approximately 4.6 mils and a mass per unit area of 0.0882 g/cm$^2$ may provide a radiation shielding equivalent or better than an aluminum radiation shield having a thickness of 15 mils and a mass per unit area of 0.103 g/cm$^2$. Thus, the example multilayer blanket weighs approximately 14% less than the aluminum radiation shield.

In another implementation, the low-Z layer 110 may be formed of aluminum and have a thickness of approximately 4 mils. The second layer 120 may be formed of tantalum sheet and have a thickness of approximately 3.2 mils. The present inventor has determined that such a two ply multilayer blanket, having a total thickness of approximately 7.2 mils and a mass per unit area of 0.163 g/cm$^2$ may provide a radiation shielding equivalent to an aluminum radiation shield having a thickness of 28.5 mils thick and a mass per unit area of 0.195 g/cm$^2$. Thus, the example multilayer blanket weighs approximately 17% less than the aluminum radiation shield. Moreover, unlike the aluminum radiation shield, the multilayer blanket is amenable to manual forming and shaping and/or by the use of use simple hand tools and shop aids.

In some implementations the first layer 110 and the second layer 120 may be adhered together by way of, for example, a flexible adhesive. For example, an adhesive layer of 1.5 mil thickness may be contemplated. In some implementations, the first layer 110 and the second layer 120 may be attached to one another by non-adhesive means. For example, mechanical fasteners such as rivets, staples, clips or the like may be contemplated. In some implementations, the mechanical fasteners may be configured to allow some degree of respective motion between the first layer 110 and the second layer 120, such that the combination of layers does not form a rigid assembly and so that differences, between the respective layers, in coefficient of thermal expansion may be more readily accommodated.

Figure 2:
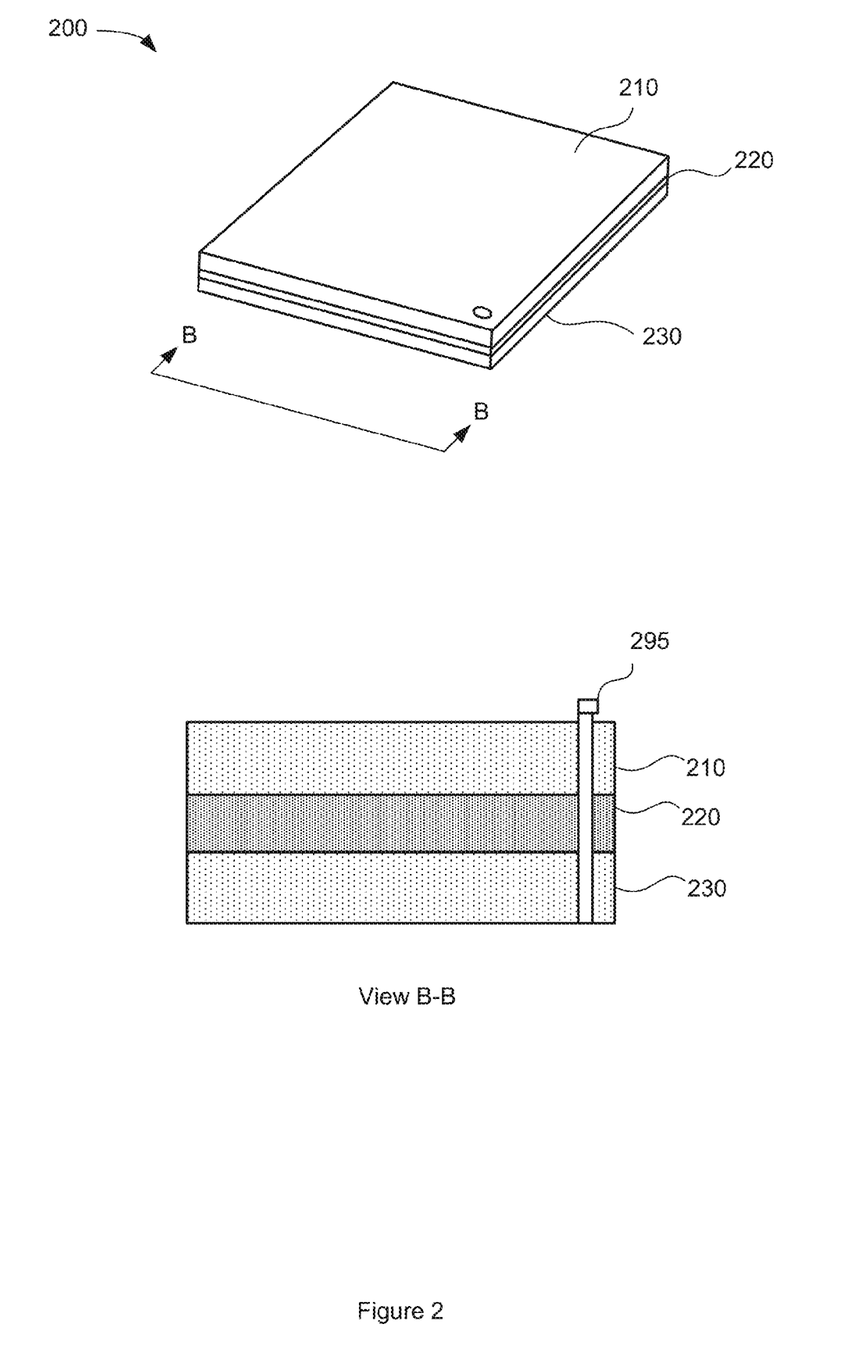
FIG. 2, illustrates an example a pliable multilayer blanket radiation shielding blanket having three layers, according to an implementation.

Referring to FIG. 2, an example is illustrated of a pliable multilayer blanket radiation shielding blanket having three layers. In the illustrated implementation, a multilayer blanket 200 includes a second layer 220 formed from material having a relatively high Z sandwiched between a first layer 210 and a third layer 230, each of the first layer 210 and the third layer 230 being formed from a material having a relatively low Z. Each of the first layer 210, the second layer 220 and the third layer 230 may have a thickness less than approximately 20 mils. Advantageously, the total thickness of the multilayer blanket 200 is less than 30 mils. In some implementations the total thickness of the multilayer blanket is less than 25 mils. As a result, the multilayer blanket may be highly pliable.

In an implementation, the first layer 210 and the third layer 230 may each have a thickness of approximately 4 mils. The second layer 220 may have a thickness of approximately 3.2 mils. The first layer 210 and the third layer 230 may be formed of a low-density insulator material such as a polyimide or Kapton™ sheet, and may each be referred to as a low-Z layer. In some implementations, the low-Z layers may be formed from polyethylene terephthalate having a density of 1.38 g/cm$^3$, for example. The second layer 220 may be formed of tantalum and may be referred to as the high-Z layer. The present inventor has determined that such a 3 ply multilayer blanket, having a thickness of approximately 11.2 mils, and a mass per unit area of 0.163 g/cm$^2$ may provide a radiation shielding equivalent to an aluminum radiation shield having a thickness of 28.5 mils and a mass per unit area of 0.195 g/cm$^2$. Thus, the example multilayer blanket weighs approximately 16% less than the aluminum radiation shield. Moreover, unlike the aluminum radiation shield, the multilayer blanket is amenable to manual forming and shaping and/or by the use of use simple hand tools and shop aids.

In the illustrated implementation, an electrically conductive insert 295, which may be referred to as a tie down ground point, is provided for charge bleed off. The conductive insert 295 may be configured to provide an electrically conductive path between each layer of the multilayer blanket, thereby providing protection against charge buildup that may result in undesirable electrostatic discharge (ESD) events. In other implementations, a thin conductive pattern like a picture frame around edges of the multilayer blanket may be contemplated to provide ESD protection.

Figure 3:
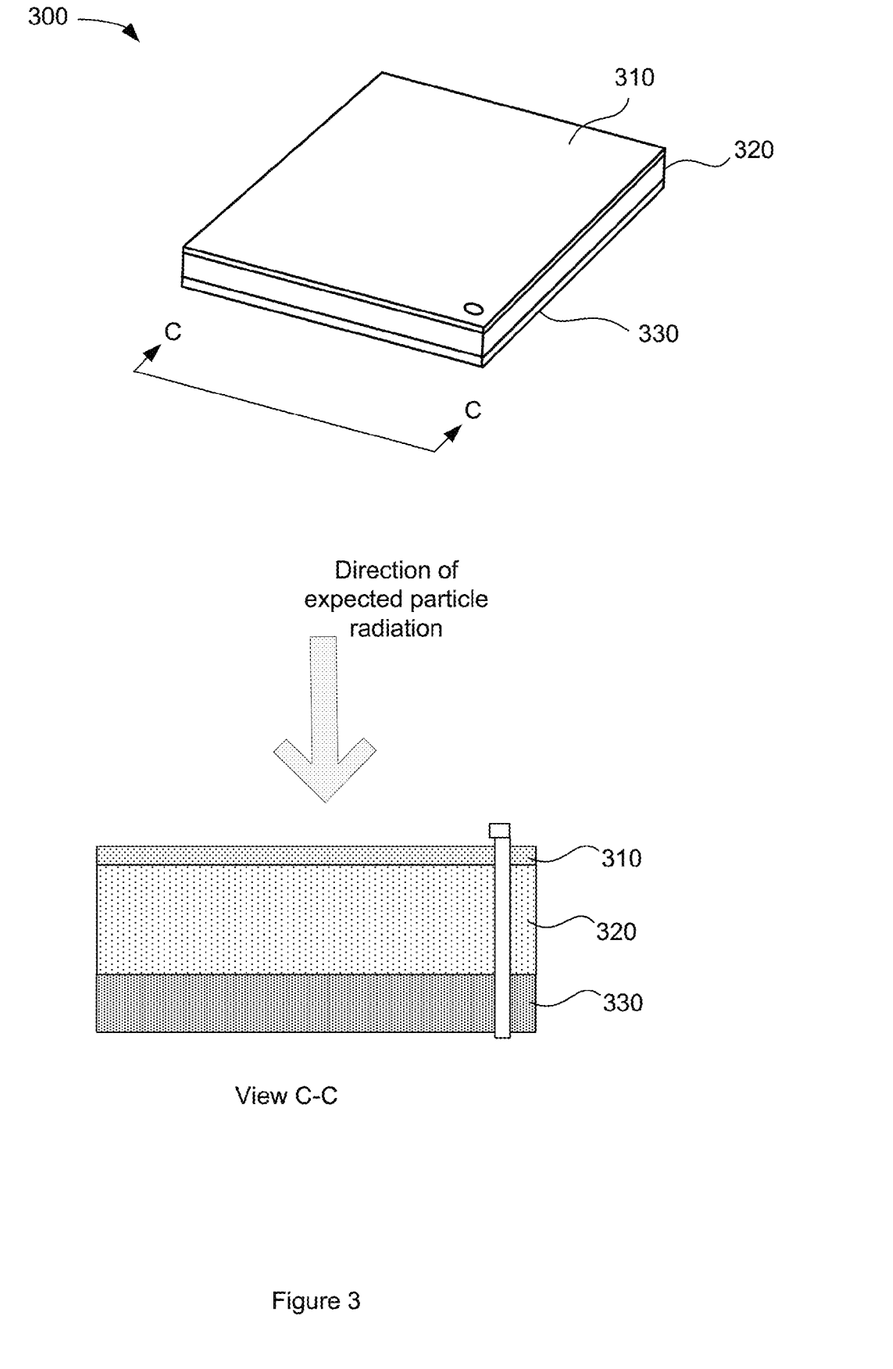
FIG. 3 illustrates another example a pliable multilayer blanket radiation shielding blanket having three layers, according to an implementation.

Referring to FIG. 3, another example is illustrated of a pliable multilayer blanket radiation shielding blanket having three layers. In the illustrated implementation, a multilayer blanket 300 includes a second layer 320 formed from material having a relatively low Z sandwiched between a first layer 310 and a third layer 330. The second layer 320 may be formed of a low-density insulator material such as a polyamide or Kapton™ sheet, and may be referred to as the low-Z layer. In some implementations, the low-Z layers may be formed from polyethylene terephthalate having a density of 1.38 g/cm$^3$, for example. In an implementation, the first layer 310 may be formed of aluminum and the third layer 330 may be formed of tantalum. When installed on a spacecraft, the first layer 310 is preferably facing a direction from which incoming particle radiation is expected to arrive.

In an implementation, the first layer 310 may have a thickness of approximately 1 mil; the second layer 320 may have a thickness of approximately 6 mils; the third layer 330 may have a thickness of approximately 3.2 mils. The present inventor has determined that such a 3 ply multilayer blanket, having a thickness of approximately 10.2 mils, and a mass per unit area of 0.163 g/cm$^2$ may provide a radiation shielding equivalent to or better than an aluminum radiation shield having a thickness of 28.5 mils and a mass per unit area of 0.195 g/cm$^2$. Thus, the example multilayer blanket weighs approximately 16% less than the aluminum radiation shield. Moreover, unlike the aluminum radiation shield, the multilayer blanket is amenable to manual forming and shaping and/or by the use of use simple hand tools and shop aids.

Figure 4:
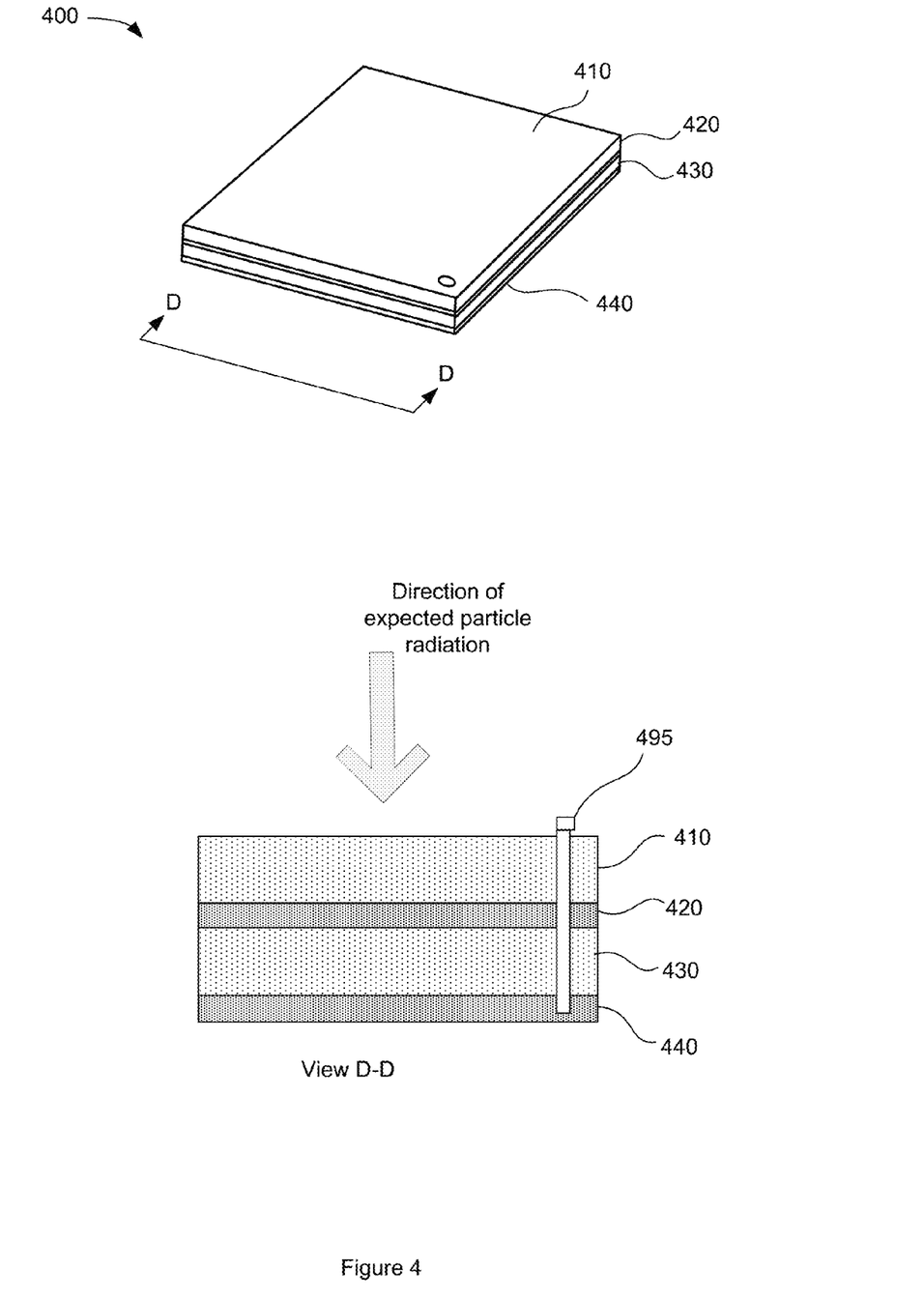
FIG. 4 illustrates an example is illustrated of a pliable multilayer blanket radiation shielding blanket having four layers, according to an implementation.

Referring to FIG. 4, an example is illustrated of a pliable multilayer blanket radiation shielding blanket having four layers. In the illustrated implementation, a multilayer blanket 400 includes a second layer 420 and a fourth layer 440, each formed from material having a relatively high Z. The second layer 420 is sandwiched between a first layer 410 and a third layer 430, each of the first layer 410 and the third layer 430 being formed from a material having a relatively low Z. Each of the first layer 410, the second layer 420 and the third layer 430 may have a thickness less than approximately 20 mils. Advantageously, the total thickness of the multilayer blanket 400 is less than 30 mils. In some implementations the total thickness of the multilayer blanket is less than 25 mils. As a result, the multilayer blanket 400 may be highly pliable.

In an implementation, the first layer 410 and the third layer 430 may each have a thickness of approximately 4 mils. The second layer 420 and the fourth layer 440 may each have a thickness of approximately 1.6 mils. The first layer 410 and the third layer 430 may be formed of a low-density insulator material such as a polyamide or Kapton™ sheet, and may each be referred to as a low-Z layer. In some implementations, the low-Z layers may be formed from polyethylene terephthalate having a density of 1.38 g/cm$^3$, for example. The second layer 420 and the fourth layer 440 may each be formed of tantalum and may be referred to as the high-Z layers. The present inventor has determined that such a 4 ply multilayer blanket, having a thickness of approximately 11.2 mils, and a mass per unit area of 0.163 g/cm$^2$ may provide a radiation shielding equivalent to or better than an aluminum radiation shield having a thickness of 28.5 mils and a mass per unit area of 0.195 g/cm$^2$. Thus, the example multilayer blanket weighs approximately 16% less than the aluminum radiation shield. Moreover, unlike the aluminum radiation shield, the multilayer blanket is amenable to manual forming and shaping and/or by the use of use simple hand tools and shop aids.

In the illustrated implementation, an electrically conductive insert 495, which may be referred to as a tie down ground point, is provided for charge bleed off. The conductive insert 495 may be configured to provide an electrically conductive path between each layer of the multilayer blanket, thereby providing protection against charge buildup that may result in undesirable electrostatic discharge (ESD) events. In other implementations, a thin conductive pattern like a picture frame around edges of the multilayer blanket may be contemplated to provide ESD protection.

Figure 5:
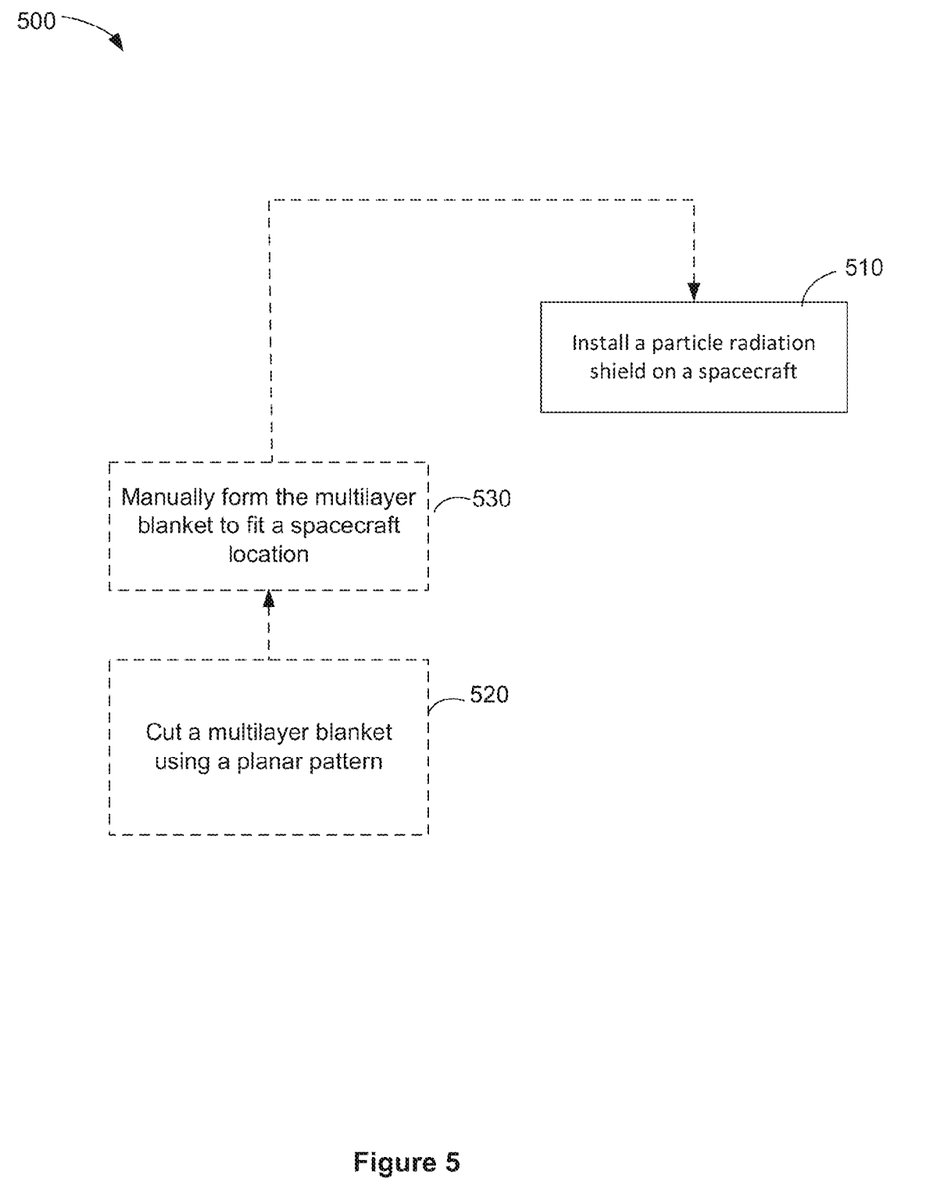
FIG. 5 illustrates a spacecraft particle radiation shielding method, according to an implementation.

Referring now to FIG. 5, a spacecraft particle radiation shielding method is illustrated. The method 500 may begin, at block 510, with installing a particle radiation shield onto a spacecraft. The particle radiation shield may be formed from a pliable multilayer blanket, the blanket including multiple layers. For example, a first layer of the multiple layers may be composed of a first material and a second layer of the multiple layers may be composed of a second material, different from the first material, each layer being less than 20 mils thick. At least one of the first material and the second material may be a nonmagnetic metal or metal alloy having atomic number (Z) of at least 29. Installing the multilayer blanket may include providing an electrically conductive coupling between an electrically conductive tie down ground point of the multilayer blanket and a spacecraft ground for charge bleed-off.

Optionally, block 510 may be preceded by one or both of blocks 520 and 530. At block 520 a multilayer blanket may be cut (from, for example, a bulk roll of sheet stock), using a planar pattern. The cutting, in some implementations, may be performed using simple hand tools, such as shears, for example. The method may continue, at block 530, with manually forming the multilayer blanket to fit a spacecraft location. For example, the multilayer blanket may be formed to fit around a spacecraft component or to enclose a spacecraft opening.

Thus, improved particle radiation shielding techniques have been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. An apparatus comprising:
    a pliable multilayer blanket configured as a particle radiation shield, the blanket including at least three layers, the at least three layers including at least one electrically nonconductive layer disposed between two electrically conductive layers, the pliable multilayer blanket including an electrically conductive coupling between the two electrically conductive layers of the pliable multilayer blanket for electrostatic discharge protection, wherein:
    a first layer of the at least three layers is composed of a first material and a second layer of the multiple layers is composed of a second material, different from the first material, each layer being less than 20 mils thick; and
    at least one of the first material and the second material is a metal or metal alloy having an atomic number (Z) of at least 29.

2. The apparatus of claim 1, wherein the pliable multilayer blanket provides a particle radiation shielding to no worse than an aluminum panel having a thickness of 15 mils.

3. The apparatus of claim 2, wherein the pliable multilayer blanket has a weight per unit area at least 10% less than the aluminum panel.

4. The apparatus of claim 1, wherein at least one layer is attached, non-rigidly, to an adjacent layer.

5. The apparatus of claim 1, wherein a flexible adhesive is disposed between the first layer and the second layer.

6. The apparatus of claim 1, wherein the first material has a first Z value and the second material has a second Z value, the first Z value being less than or equal to 75% of the second Z value.

7. The apparatus claim 6, wherein the first material is a non-metal and the second material is a nonmagnetic metal or nonmagnetic metal alloy.

8. The apparatus of claim 7, wherein the first material is aluminum or a polyamide composite and the second material is copper, molybdenum, tin or tantalum.

9. The apparatus of claim 1, wherein a total thickness of the pliable multilayer blanket is less than 30 mils.

10. The apparatus of claim 1, wherein the electrically conductive coupling includes one or both of conductive insert and a thin conductive pattern disposed around edges of the multilayer blanket.

11. The apparatus of claim 1, wherein a third layer is composed of one of the first material and the second material.

12. The apparatus of claim 1, wherein a third layer is composed of a third material that is different from both the first material and the second material.

13. The apparatus of claim 1, wherein the pliable multilayer blanket provides a radiation shielding no worse than an aluminum panel having a thickness of 28.5 mils.

14. The apparatus of claim 13, wherein the pliable multilayer blanket has a mass per unit area at least 15% less than the aluminum panel.

15. A method comprising:
    installing a particle radiation shield onto a spacecraft, wherein the particle radiation shield is formed from a pliable multilayer blanket, the blanket including at least three layers, the at least three layers including at least one electrically nonconductive layer disposed between two electrically conductive layers, the pliable multilayer blanket including a first electrically conductive coupling between the two electrically conductive layers of the pliable multilayer blanket for electrostatic discharge protection, wherein:
    a first layer of the at least three layers is composed of a first material and a second layer of the multiple layers composed of a second material, different from the first material, each layer being less than 20 mils thick; and
    at least one of the first material and the second material is a metal or metal alloy having atomic number (Z) of at least 29.

16. The method of claim 15, wherein the first material has a first Z value and the second material has a second Z value, the first Z value being less than or equal to 75% of the second Z value, and installing the particle radiation shield includes disposing the pliable multilayer blanket on the spacecraft such that the first material is facing a direction from which incoming particle radiation is expected to arrive.

17. The method of claim 15, wherein:
    the first electrically conductive coupling includes one or both of a conductive insert and a thin conductive pattern disposed around edges of the multilayer blanket; and
    installing the particle radiation shield includes providing a second electrically conductive coupling between the first electrically conductive coupling and an electrical ground point of the spacecraft.

18. The method of claim 15, wherein installing the particle radiation shield includes cutting, from a bulk amount of multilayer sheet stock, a multilayer blanket having a shape defined by a planar pattern, and manually forming the multilayer blanket to fit around a spacecraft component.

* * * * *

UNITED STATES PATENT AND TRADEMARK OFFICE
CERTIFICATE OF CORRECTION

PATENT NO.            : 9,640,288 B1
APPLICATION NO.       : 14/954583
DATED                 : May 2, 2017
INVENTOR(S)           : Kit Pui Frankie Wong

Page 1 of 1

It is certified that error appears in the above-identified patent and that said Letters Patent is hereby corrected as shown below:

In the Claims

Column 7, Lines 41-43, Claim 2 should read:
"2. The apparatus of claim 1, wherein the pliable multilayer blanket provides a particle radiation shielding no worse than an aluminum panel having a thickness of 15 mils."

Signed and Sealed this
Eighteenth Day of June, 2019

Andrei Iancu
*Director of the United States Patent and Trademark Office*